United States Patent [19]
Myers

[11] 3,825,280
[45] July 23, 1974

[54] ADJUSTABLE STABILIZER SUPPORT FOR VEHICLES

[75] Inventor: Jimmy D. Myers, Morton, Ill.

[73] Assignee: Caterpillar Tractor Co., Peoria, Ill.

[22] Filed: Aug. 27, 1973

[21] Appl. No.: 391,548

[52] U.S. Cl. .......................... 280/150.5, 254/86 H
[51] Int. Cl. ............................................. B60s 9/10
[58] Field of Search...... 280/150.5; 254/86 R, 86 H; 248/354 H, 357

[56] References Cited
UNITED STATES PATENTS
3,642,242  2/1972  Danekas ......................... 280/150.5
3,711,118  1/1973  Kirwan .......................... 280/150.5

FOREIGN PATENTS OR APPLICATIONS
1,034,568  7/1958  Germany ......................... 248/357

Primary Examiner—M. Henson Wood, Jr.
Assistant Examiner—Robert Saifer
Attorney, Agent, or Firm—Ralph E. Walters

[57] ABSTRACT

An adjustable stabilizer support for a vehicle selectively engageable with a support surface for stabilizing the vehicle when subjected to external loading includes an axially fixed elongated guide member supported on the vehicle with a leg member disposed in relatively extendible guided relation on the guide member wherein elevationally spaced spherical bearing sockets are formed on the guide and leg members and an extensible retractable fluid motor having spherical bearing surfaces formed on the opposite ends thereof is disposed for self-aligning load bearing contact with the spherical bearing sockets when the leg member is extended into engagement with the support surface by extension of the fluid motor.

6 Claims, 3 Drawing Figures

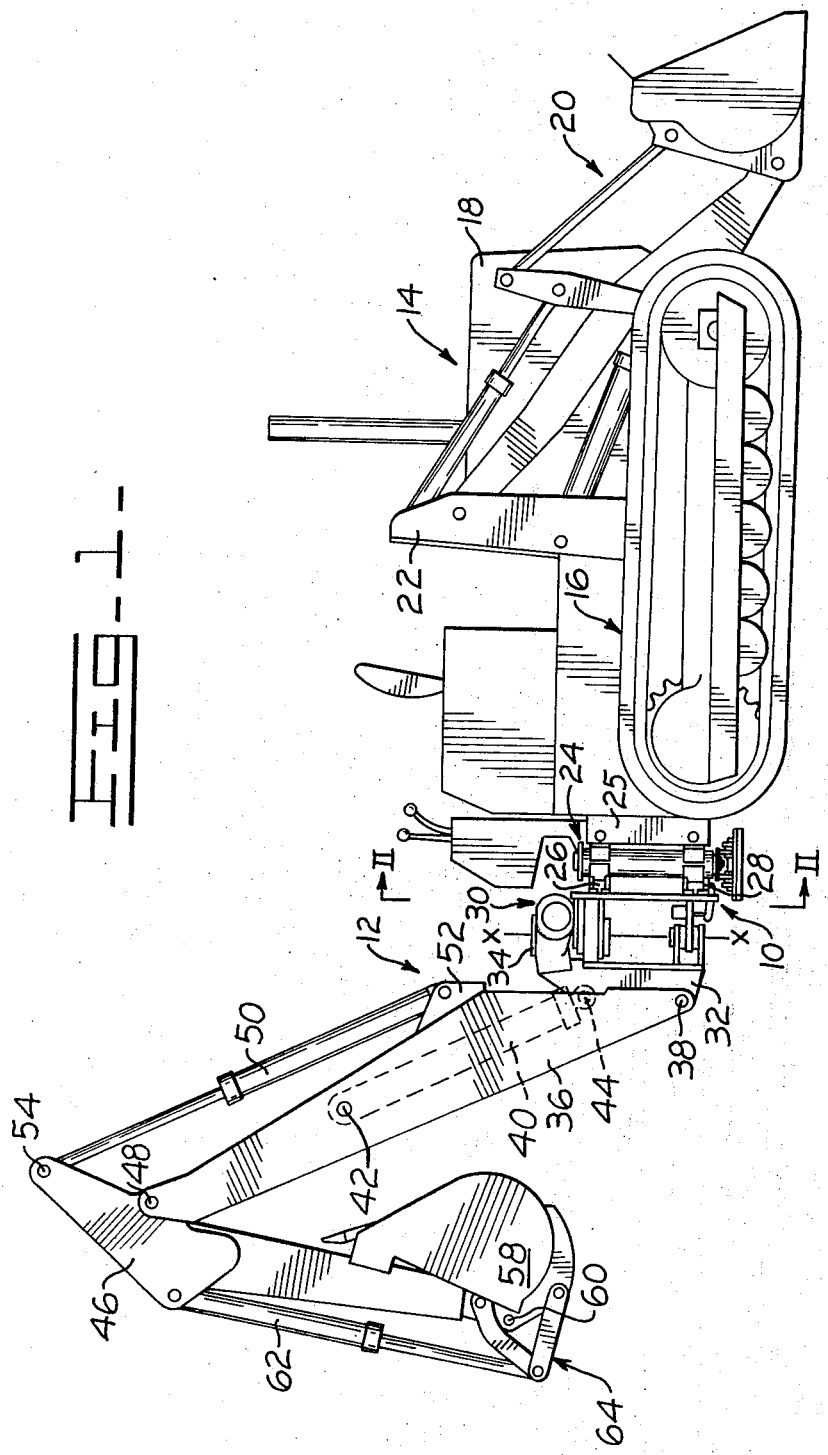

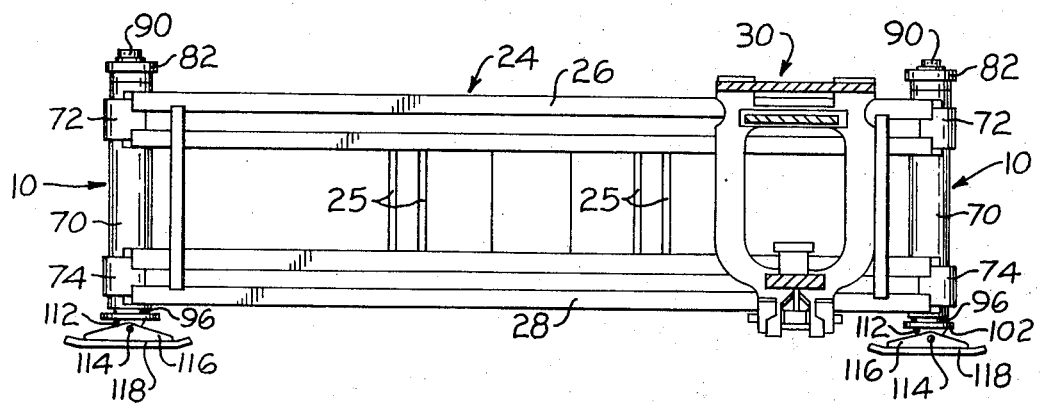
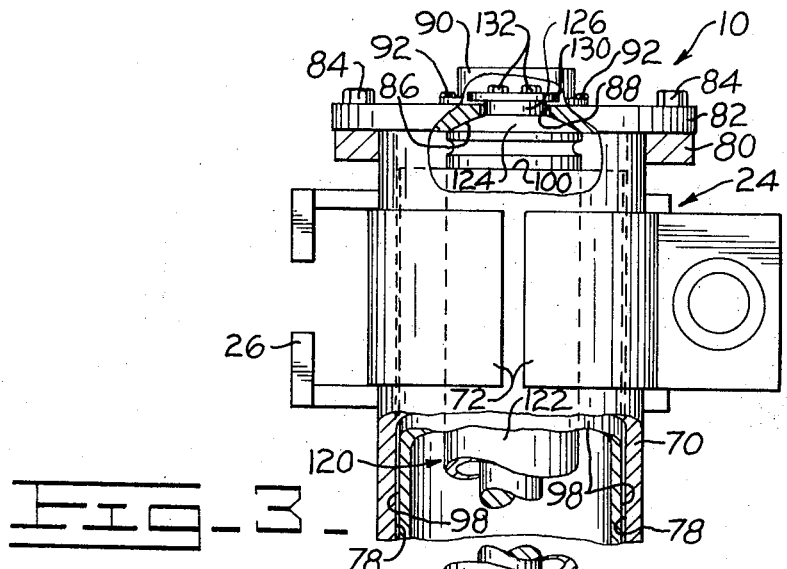
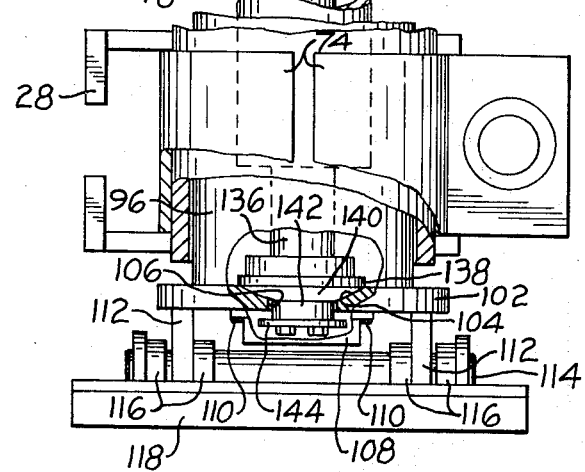

ADJUSTABLE STABILIZER SUPPORT FOR VEHICLES

BACKGROUND OF THE INVENTION

It is common practice in the earthmoving industry to provide outriggers on various types of earthmoving equipment which are extendible into engagement with the ground or support surface upon which the vehicle is operating to stabilize that vehicle vertically with respect to external loading during the work operation performed by the implement mounted thereon. U.S. Pat. No. 3,716,252 to Johnson; U.S. Pat. No. 3,275,163 to Scharff; and British Pat. 1,311,545 to Goodwins et al typify the present state of the art of such outriggers and the like. Such outriggers normally include a tubular guide secured to the vehicle with an extendible retractable leg slidably mounted in the guide for actuation in any suitable manner such as by a hydraulic cylinder for extension into contact with the support surface for purposes of stabilizing the vehicle. Due to the substantial manufacturing tolerances required in economically fabricating such guide and leg members, the legs are loosely fitted in the guide member such that they are subject to lateral shifting or cocking due to the imposition of horizontal loads on the vehicle tending to move it along the support surface upon which it is operating. Since the hydraulic cylinders for actuation of the leg are generally pin mounted to the guide and leg elements, such lateral shifting or cocking of the leg in the guide member can result in substantial side loading of the hydraulic jack components which is detrimental to the life of the bearings and seals in the hydraulic jack. Such side loading of the bearing and seal components can result in premature failure of those components, thus requiring expensive down time of the vehicle and frequent repair or replacement of the hydraulic jacks.

SUMMARY AND OBJECTS OF THIS INVENTION

Accordingly, it is an object of this invention to provide an improved adjustable stabilizer support for a vehicle.

Another object of this invention is to provide such an improved stabilizer support which is moved between operative and inoperative positions by an expansible fluid motor universally pivotally mounted between the vehicle and an extendible portion of the stabilizer to permit self-alignment of the fluid motor.

Another object of this invention is to provide an improved stabilizer of the character described utilizing a spherical mounting at the opposite ends of the fluid motor to minimize side loading between the relatively movable components thereof whereby seal and bearing life in the fluid motor is prolonged.

Other objects and advantages of the present invention will become more readily apparent upon reference to the accompanying drawings and following description.

BRIEF DESCRIPTION OF THE DRAWINGS

FIG. 1 is a side elevational view of a crawler tractor loader having a side shiftable backhoe mechanism mounted on the rear end thereof including adjustable stabilizer supports embodying the principles of the present invention.

FIG. 2 is an elevational view taken generally along the lines II—II of FIG. 1 illustrating the laterally extending slide frame having an adjustable stabilizer support of the present invention individually mounted at the opposite outer ends thereof.

FIG. 3 is an end view of the slide frame illustrating one of the adjustable stabilizer supports with portions thereof broken away to illustrate the features of the present invention.

DESCRIPTION OF THE PREFERRED EMBODIMENT

Referring more particularly to the drawing, an adjustable stabilizer support embodying the principles of the present invention is generally indicated by the reference numeral 10 as operatively associated with a side shiftable backhoe mechanism 12 which is mounted at the rear end of a crawler tractor loader designated generally at 14. The tractor loader includes a pair of laterally spaced generally parallel track assemblies 16 disposed at opposite sides of a body 18 for propelling the tractor loader along the ground. A loader mechanism 20 is pivotally supported in powered relation to a loader frame 22 and extends forwardly of the vehicle in the usual manner.

The side shifting backhoe mechanism 12 is mounted rearwardly of the tractor and includes a laterally extending slide frame generally indicated at 24 which is rigidly pinned to a suitable number of brackets 25 secured to the tractor loader body 18. The slide frame includes a pair of elevationally spaced laterally extending upper and lower rails 26 and 28, respectively. A swing bracket 30 is slidably secured to the rails and pivotally supports a bracket 32 which is adapted for pivotal movement around a vertical axis X by any suitable power source such as a rotary actuator 34.

A backhoe boom 36 has one end pivotally secured at 38 to the lower end of the bracket 32 and extends rearward therefrom. A hydraulic jack 40 is pivotally connected at 42 to the boom 36 intermediate its ends and has its opposite end pivotally connected at 44 to the upper end of the bracket 32 to provide for powered raising and lowering of the boom about its pivotal connection 38. A dipper stick 46 is pivotally connected intermediate its ends at 48 to the outer end of the boom. A hydraulic jack 50 is pivotally secured at one end to a bracket 52 secured to the boom 36 and has its other end pivotally connected at 54 to the dipper stick 46 for powered manipulation thereof. A material handling bucket 58 is pivotally secured at 60 to the outer end of the dipper stick and is powered for limited rotation relative thereto by a hydraulic jack 62 and a suitable linkage indicated generally at 64.

As is best illustrated in FIGS. 2 and 3, a pair of the adjustable stabilizer supports 10 are individually secured to the opposite outer ends of the slide frame 24. The stabilizer supports are identical in construction; therefore, the following description will be directed to one of the stabilizer supports with it being recognized that such description is equally applicable to the other stabilizer support.

The stabilizer support 10 includes an axially fixed elongated tubular guide member 70 which is rigidly secured to the upper and lower rails 26 and 28 of the slide frame 24 by two pairs of support plates 72 and 74 which are respectively welded to the upper and lower slide rails and to the tubular guide member 70. Although the cross sectional shape of the guide member 70 is not critical, in one preferred embodiment the shape of the guide member is essentially rectangular to provide four opposed guide surfaces. two of which are indicated at 78. A bolting flange 80 is secured to the upper end of the guide member 70 such as by welding to provide means for attaching a bearing plate 82 which is secured to the flange 80 by a plurality of bolts 84. The bearing plate includes a spherical surface 86 which forms a downwardly facing open spherical socket in substantially coaxial relation to the elongated guide member 70. A bore 88 extends through the bearing plate 82 in substantially coaxial intersecting alignment with the spherical socket for purposes hereinafter described. A removable cap 90 is secured by capscrews 92 to the bearing plate 82 in covering relation to the bore 88.

An elongated tubular leg member 96 of generally rectangular configuration is loosely slidably fitted within the guide member 70 in a manner such that a plurality of outer surfaces 98 thereon are disposed in slightly spaced slidable relation to the inner surfaces 78 of the guide member 70. The leg member 96 includes an open upper end 100 and is partially closed at its lower end by a bearing plate 102. The bearing plate includes an upwardly facing spherical surface 104 forming an open spherical socket therein in opposed generally coaxial relation to the spherical socket formed in the bearing plate 82 by the spherical surface 86. A bore 106 extends through the bearing plate 102 in coaxial intersecting relation with the spherical socket formed therein for purposes hereinafter described. A cap 108 is secured to the bearing plate 102 by a plurality of capscrews 110 in closing relation to the bore 106. A pair of spaced downwardly extending brackets 112 are secured to the lower side of the bearing plate 102 for pivotal connection by means of a pin 114 to two pair of ears 116 secured to the upper surface of a ground engaging shoe 118.

A hydraulic jack 120 includes a cylinder 122 having a spherical bearing surface 124 formed adjacent its upper outer end for self-aligning mating contact with the spherical socket formed by the surface 86. A concentrically disposed extension 126 of somewhat lesser diameter than the bore 88 extends outwardly of the spherical surface 124 in loosely fitted telescopic relation to the bore 88 and is of sufficient length to extend slightly above the plate 82. A retainer plate 130 is secured to the extension 126 by capscrews 132 and is of a diameter slightly greater than that of the bore 88 so as to prevent its passing through the bore. Since the extension 126 extends above the bearing plate 82 with the spherical surface 124 seated in the spherical socket, the retainer plate is spaced from the bearing plate 82 under those conditions.

A piston rod 136 extends into the cylinder 122 to where its inner end is secured to a piston, not shown. The outer downwardly extending end of the piston rod 136 includes an enlarged collar 138 having a spherical bearing surface 140 formed thereon for self-aligning load bearing contact with the spherical socket formed by the surface 104. This spherical bearing construction is substantially identical to that described with respect to the upper outer end of the cylinder 122 and includes a reduced diameter concentrically disposed extension 142 extending in loosely fitted relation through the bore 106 for attachment of a retainer plate 144 disposed in spaced relation to the bearing plate 102 when the spherical bearing thereon is engaged with the socket formed by the surface 104.

OPERATION

While the operation of the present invention is believed clearly apparent from the foregoing description, further amplification will subsequently be made in the following brief summary of such operation. With reference to the drawings, when it is desired to operate the backhoe mechanism 12, the operator actuates a suitable control, not shown, to direct fluid pressure to the upper end of the cylinder 122 of the hydraulic jack 120 to urge the piston rod 136 downwardly. This is effective to lower the leg member 96 to bring the ground engaging shoe 118 into contact with the work surface. As the shoe 118 contacts the work surface, the bearing surfaces 124 and 140 will be respectively brought into self-aligning load bearing contact with the surfaces 86 and 104 of the spherical sockets. The operator then neutralizes the control mechanism to lock the hydraulic fluid in the upper end of the cylinder to stabilize the vehicle relative to the work surface.

The backhoe mechanism 12 is then manipulated transversely of the vehicle to the desired position on the slide frame 24 to position the implement for digging in the proper area. The operator may then by manipulation of the boom 36, the dipper stick 46, and the bucket 58 bring the bucket into a digging position with the ground or other material to be handled. The digging force required for loading the bucket 58 not only exerts a downward vertical force on the tractor 14, but also results in horizontal forces tending to move the tractor horizontally relative to the work surface.

Since the leg member 96 is loosely slidably fitted in the guide member 70, limited lateral movement is permitted prior to load bearing contact between the surfaces 98 on the leg and the inner surfaces 78 of the guide member. This movement of the leg within the guide member can result in cocking of the hydraulic jack 120 at an angle with respect to the vertical axis of the guide and leg members. The spherical bearing between the opposite ends of the hydraulic jack and the bearing plates 82 and 102 permits the jack to be essentially self-aligning so as to avoid side loading of the rod 136 relative to the cylinder 122. With the jack under a load bearing condition so that the spherical surfaces 124 and 140 are in contact with the spherical sockets formed by surfaces 86 and 104, respectively, the retainer plates 130 and 144 are spaced from the bearing plates 82 and 102 to permit such self-aligning movement of the hydraulic jack without interference between the retainer plates and the bearing plates secured to the guide and leg members.

When it is necessary to move the vehicle, the operator again manipulates the stabilizer control mechanism to introduce fluid pressure to the lower or rod end of the hydraulic jack 120 and at the same time venting the head end of the jack. This is effective to retract the rod 136 into the cylinder 122 such that the retainer plate 130 engages the bearing plate 82 while the retainer plate 144 engages the bearing plate 102 under which conditions the spherical bearings are spaced a distance identical to the previous spacing of the retainer plates 130 and 144 with respect to the bearing plates 82 and 102. Since the force required to lift the leg 96 from the work surface is relatively small, the retainer plates 130 and 144 are capable of lifting the leg to a retracted nonoperative position to permit the operator to move the vehicle to a new work location.

In view of the foregoing, it is readily apparent that the adjustable stabilizer support of the present invention permits the stabilizer leg to be loosely slidably fitted in the guide member to insure unrestricted elevational adjustment of the leg while insuring that the components of the hydraulic jack for actuating the leg are not subjected to side loads and excessive wear thereof. The spherical bearings are provided between the opposite ends of the hydraulic jack and the guide and leg members and permit the jack to be essentially self-aligning therebetween regardless of the lateral movement of the leg relative to the guide member or slight cocking therein due to horizontal forces exerted on the vehicle. This maintains exact alignment of the hydraulic jack cylinder and rod so as to avoid any side loading on the bearings and seals therein and consequently results in greatly extended service life of the hydraulic jack components.

While the invention has been described and shown with particular reference to the preferred embodiment, it will be apparent that variations might be possible that would fall within the scope of the present invention which is not intended to be limited except as defined by the following claims.

What is claimed is:

1. An adjustable stabilizer support for a vehicle selectively engageable with a support surface for stabilizing the vehicle relative to the support surface when subjected to external loading comprising;
    elongated guide means rigidly supported on such a vehicle;
    leg means disposed in relatively movable loosely guided relation on said elongated guide means;
    means individually forming elevationally spaced opposed spherical bearing sockets on said elongated guide means and said leg means; and
    an extensible-retractable fluid motor having opposite ends individually providing oppositely facing spherical bearing surfaces respectively disposed for self-aligning load bearing contact with said elevationally spaced spherical bearing sockets when said leg means are extended into engagement with the support surface by extension of said fluid motor.

2. The adjustable stabilizer support of claim 1 including separate bearing means formed on said elongated guide means and said leg means; and
    retainer means formed on said opposite ends of the fluid motor and selectively engageable with said separate bearing means for retracting said leg means when said fluid motor is retracted.

3. The adjustable stabilizer support of claim 2 wherein said retainer means on said fluid motor includes a pair of retainer plates which are individually disposed in a first predetermined axially spaced relation to a respective one of said oppositely facing spherical bearing surfaces and said separate mating bearing means includes a pair of bearing surfaces which are individually disposed in a second predetermined axially spaced relation to a respective one of said opposed spherical sockets on said elongated guide means and said leg means whereby said retainer means are spaced from said separate mating bearing means when said spherical bearing surfaces are disposed in load bearing contact with said opposed spherical sockets to permit unrestrained limited rocking movement of said fluid motor relative to said guide and leg means.

4. The adjustable stabilizer support of claim 3 wherein said elongated guide means and said leg means are individually formed as substantially tubular members with said leg means being sized relative to said guide means so as to be loosely slidably telescopically fitted therein, said tubular members having open upper and lower ends wherein said means forming said elevationally spaced opposed spherical bearing socket including a pair of bearing plates individually secured in substantially closing relation to said upper end of said tubular guide means and said lower end of said leg means whereby said fluid motor is substantially completely protectively enclosed by said tubular members and said bearing plates.

5. The adjustable stabilizer support of claim 4 wherein said bearing plates include vertically spaced inner and outer surfaces with said outer surfaces forming said separate bearing means and said means forming said spherical bearing sockets include annular spherical surfaces formed respectively on said inner surfaces of said bearing plates;
    means individually forming an opening of a predetermined radial size through each of said bearing plates in coaxial intersecting relation to said spherical bearing sockets;
    extension means of radially smaller size than said predetermined radial size individually secured to said opposite ends of said fluid motor in outwardly extending relation to said oppositely facing spherical bearing surfaces for radially spaced telescopic relation with said openings in said bearing plates and said extension means are individually of a length greater than said vertical spacing of said inner and outer surfaces of said bearing plates and individually including an outer end; and
    said retainer plates are secured to said outer ends of said extension means in individually relatively closely spaced relation to said outer surfaces and having radial dimensions greater than said predetermined radial size of said openings so that said retainer plates are selectively engageable with said outer surfaces for retraction of said leg means and in spaced nonrestraining relation thereto when said leg means are extended to permit limited self-aligning movement of said fluid motor therein.

6. The adjustable stabilizer support of claim 5 including a support surface engaging pad pivotally connected to the lower end of said leg means.

* * * * *